United States Patent [19]

Meyer

[11] 4,428,732
[45] Jan. 31, 1984

[54] EDUCATIONAL AND AMUSEMENT APPARATUS

[76] Inventor: David A. G. Meyer, 714 E. Washington St., Appleton, Wis. 54911

[21] Appl. No.: 335,609

[22] Filed: Dec. 30, 1981

[51] Int. Cl.³ .............................. G09B 1/40; A63F 9/10
[52] U.S. Cl. .................................. 434/160; 273/157 R
[58] Field of Search ..................... 434/160; 273/157 R

[56] References Cited

U.S. PATENT DOCUMENTS

| | | | |
|---|---|---|---|
| 171,507 | 12/1875 | Dennis, Jr. | 273/157 R X |
| 179,023 | 6/1876 | Hyatt et al. | 273/157 R |
| 257,630 | 5/1882 | Whitney | 273/157 R X |
| 601,811 | 4/1898 | Landes | 273/157 R |
| 713638 | 11/1902 | Hepfinger | 434/160 |
| 1,119,309 | 12/1914 | Nordman | 273/157 R |
| 1,477,322 | 12/1923 | Degheri | 273/157 R X |
| 1,841,369 | 1/1932 | Freeman | 273/157 R X |
| 1,854,999 | 4/1932 | Ralls | 273/157 R X |
| 2,693,963 | 11/1954 | Muscato | 434/160 X |
| 3,075,304 | 1/1963 | Votolato | 434/160 |

FOREIGN PATENT DOCUMENTS 157563  1/1921  United Kingdom ................ 434/160

Primary Examiner—William H. Grieb
Attorney, Agent, or Firm—Andrus, Sceales, Starke & Sawall

[57]    ABSTRACT

An educational and amusement device includes elements in the form of an alphabet and/or the digits of a numbering system. Each character element is similarly divided by a plurality of essentially similar parallel lines, which may consist of a first set of parallel lines alone or first and second sets, with the second set of parallel lines oriented to extend in an opposite and perpendicular direction from such first set of lines. Each element includes at least three parts but less than ten, and preferably is four or five parts for sufficient complexity to maintain interest of a child or other person having a learning disability but of a sufficient simplicity to prevent frustration. Each element may be formed with the parts releasably interconnected with each other as by water soluble adhesive. Each element can be made progressively more complex.

4 Claims, 3 Drawing Figures

EDUCATIONAL AND AMUSEMENT APPARATUS

BACKGROUND OF THE PRESENT INVENTION

This invention relates to an educational and amusement apparatus for developing knowledge of the letters of an alphabet, digits of a numbering system and the like.

Various devices have been suggested for teaching and developing a knowledge of the letters of the alphabet, the digits of a numbering system and the like; particularly for children. It is well known that such devices must be designed such that the child's interest is not only initially attracted but is maintained over a sufficient period to develop a working knowledge, if education is the desired purpose, or to maintain interest if amusement over any extended period of time is the desired result. Many educational and amusement devices have been suggested wherein the letters of the alphabet and/or the digits are provided in a divided form similar to a well known puzzle structure. In such system, the individual letters or numbers are formed of a plurality of parts which in turn may be formed of any suitable material such as cardboard, wood or, under modern day practice, molded plastic or other materials. In certain instances, the prior art has suggested that the individual letters or parts be color coded so that the individual elements can be separated from a total mass of components making up a complete alphabet, number set or a substantial part thereof. For example, the following patents all suggest various educational and amusement devices generally of the above characteristic.

U.S. Pat. No. 171,507, J. Dennis, Jr., Dec. 28, 1875;
U.S. Pat. No. 179,023, C. M. Hyatt et al, June 20, 1876;
U.S. Pat. No. 257,630, A. D. T. Whitney, May 9, 1882;
U.S. Pat. No. 601,811, J. H. Landes, Apr. 5, 1898;
U.S. Pat. No. 1,119,309, J. J. Nordman, Dec. 1, 1914;
U.S. Pat. No. 1,477,322, T. M. Degheri, Dec. 11, 1923;
U.S. Pat. No. 1,841,369, D. M. Freeman, Jan. 19, 1932;
U.S. Pat. No. 1,854,999, E. Ralls, Apr. 19, 1932.

Although various devices have been suggested, the present inventor does not know of a device which has in fact been commercially exploited. It is the inventor's opinion and it is believed that this is true because the prior art devices have overlooked one of the very essential characteristics which must be considered in devising an educational and amusement device to be used by children in the initial learning stages. More particularly, the present inventor has realized that it is important to present the characters in individual presentations with sufficient complexity to maintain the interest and the attention but without such complexity as to create any source of confusion which may create or result in a lost of interest if not absolute frustration with the teaching device.

The present invention is directed to an educational and amusement device which can be readily used for initial teaching which simultaneously presents a challenge to the student and will be of sufficient characteristic to maintain their attention and interest in assembling of the elements to form the letters, numbers or the like.

SUMMARY OF THE PRESENT INVENTION

The present invention is particularly directed to an educational and amusement device in which the letters of an alphabet and/or the digits of a numbering system, hereinafter referred to generically as characters, are presented as elements of multiple parts. Each character element is similarly divided by a plurality of essentially similar parallel lines, which are more or less arbitrarily spaced from each other, and which may consist of a first set of parallel lines alone or first and second sets, with the second set of parallel lines oriented to extend in an opposite direction from such first lines and preferably in substantially perpendicular relationship. The parallel lines of the characters present similar surfaces which can be arranged in various abutting engagements and with the mating surfaces detected from the length thereof and the orientation mating. Each character element, in another aspect of the invention, consists of at least three parts but less than ten, and preferably less than six parts, in order to establish a device of sufficient complexity to maintain interest but of a sufficient simplicity to prevent frustration by the average normal learning child. By providing the reasonable number of parts as presented herein, the complexity is not an extremely simple presentation but one of some difficulty and challenge to the child.

Further if considered desirable to employ a progressive development of the complexity of the system, the characters can be formed with the parts releasably interconnected with each other in any suitable manner, such as by water soluble adhesive. The character element may then be divided in a lesser number of parts, subsequently each character element can be made progressively more complex. This would allow the individual tailoring of the device to the development of the child.

Further, in an optimum construction, the individual characters may be presented in a more or less block diagram which in total will present a more readily recognized lettering system and one which further provides for easier recognition of the orientation of the characters.

Each character is preferably color coded or otherwise uniquely coded such that the parts for that character can be quickly separately and used to develop the desired character. Thus, each character may be color coded or if formed of an appropriate construction each part may be number coded, with the appropriate letter or number and a second common member identifying the number of parts. For example, if the letter "A" is formed with five parts; each part could be identified as "A-5;" thereby showing the child the letter being formed and the number of parts. This may be particularly desirable in certain stages of the educational system or use of the device to further assist the student during the early stages of his development.

Thus, the present device provides a system through which the basic science of language and/or numbers can be more readily grasped while maintaining the natural curiosity and interest of a young child, as well as a learning tool for older children of adults having a learning disability.

The device can be readily formed in a practical, inexpensive commercial production system.

These and other objects will be obvious from the following description of a particular embodiment of the invention.

DESCRIPTION OF THE DRAWING FIGURES

The drawing furnished herewith illustrates a preferred construction of the present invention in which the above advantages and features are clearly disclosed as well as others which will be readily understood from the following description.

DESCRIPTION OF THE ILLUSTRATED EMBODIMENT

Figure 1:
FIG. 1 is a plan view of letters of the alphabet in a more or less block diagram, with each letter divided into a plurality of parts based upon the teaching of the present invention.

Referring to the drawing and particularly to FIG. 1, the twenty-six letters A through Z, inclusive, of the English alphabet are shown as similar block-like elements 10. Each element 10 is a separate letter having outer edges formed as relatively straight lines, properly oriented to readily define the corresponding letter.

For example, the letter A is shown with opposite angle side walls 12 and 13 connected at the upper end by a relatively short horizontal wall 14. The bottom edge of the letter "A" is formed by similar horizontal walls 15 extending inwardly toward each other from the outer side walls 12 and 13 and joined at the inner spaced end by an inverted rectangular U-shaped wall 16. The bottom walls 15 terminate to extend approximately one third the total width of the letter Generally, a triangle is centrally located to define an opening 17 in the letter "A". This configuration thus defines a readily recognized block-type A. The letters B, C and D are similarly formed with appropriate rectangular internal openings 18 and with the outer corners chamfered or cut as at 19 to more clearly define the character of such letters. All of the other letters are similarly identified and formed with relatively similar block-like top, bottom and intermediate sections.

In accordance with the present invention, each of the character elements is similarly divided into a plurality of parts consisting of at least three parts but no more than ten parts. In accordance with the teaching of the present invention, all of the letters are similarly divided by generally similarly-angularly oriented, parallel lines. The dividing lines 20 are shown in the drawings by solid separating lines.

Referring particularly to the character element "A," the element is divided into five separate parts 21, 22, 23, 24 and 25. These parts are defined by a first pair of parallel lines 26 and 27 of lines 20. With reference to a centered cartesson coordinate system, shown in dashed outline for reference purposes only, the lines 26 and 27 are angularly oriented diagonally across the letter in the direction from the second to the fourth quadrant. The lines 26 and 27 are shown substantially equally spaced to provide two separations, intermediate the height of the letter "A". In addition, a similar separating line 28 extends angularly through the letter but in the opposite orientation or coordinate direction from the first set of parallel lines; that is, between the first and third quadrants of the cartesian coordinate system. The line 28 is shown bisecting the one lower line of the first group immediately below the defining opening 17. This provides for one possible separation of the "A" element into five component parts 21—25, all of which are of sufficient size to allow ready manipulation by the child.

The letter "B" element is shown separated by a single group of three parallel lines 30, similarly all extending in the same coordinate direction. The letter "C" element is separated by a plurality of four parallel lines 31, but angularly oriented in the opposite direction from those of the letter "B" element. The letter "D" element is shown separated by two sets of lines, but with the one line 33 extended through only one part of limb of the letter, shown as the lower right corner to provide a division into distinct parts.

The separation for all of the other letters of the alphabet show various other combinations and arrangements of the two groups of separating lines which might be employed in the construction of the characters of the alphabet.

In the illustrated series, the letters are shown divided into four to six separate parts which is believed to provide a particularly acceptable number of components for use by a child of normal development. In accordance with one aspect of the present teaching, each element includes at least three parts but less than ten parts. This presents an educational device of proper simplicity and complexity for purposes of education and/or amusement particularly adapted for young children, an older child, or an adult with a learning disability. Thus, the interest can be maintained without creating unnecessary confusion or difficulty.

Figure 2:
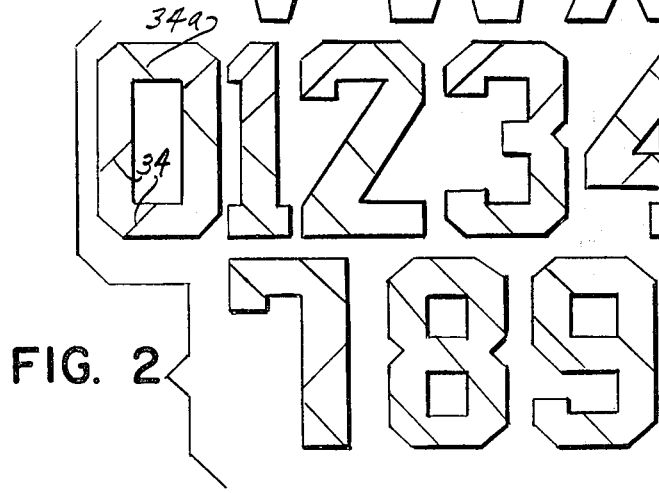
FIG. 2 is a view similar to FIG. 1 illustrating the decimal digits 0-9, inclusive, with a similar separation of the individual digit into a plurality of parts.

The digits 0-9 of the Dewey decimal system of members is similarly shown in FIG. 2, with each of the digits correspondingly divided by a first set of parallel lines 34 and/or a second set of oppositely directed parallel lines 34a, each group consisting of one or more lines.

It is believed that a study of this application will indicate the desirability of having the substantially parallel lines dividing each element. Although the lines should be essentially parallel, divergence from such parallel relationship can of course be readily accepted, particularly where the lines are rather widely separated, for example, as shown in connection with the digit 8.

Figure 3:
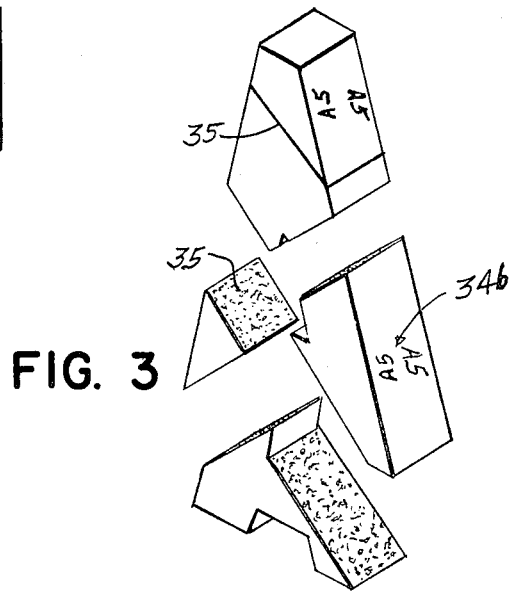
FIG. 3 is an exploded pictorial view for purposes of clearly showing one preferred construction of the present invention.

Referring particularly to FIG. 3, the parts of an element for the character "A" are shown in an exploded illustration for clearly disclosing one embodiment of the invention. In this embodiment, the characters would be formed of block-like parts having a significant thickness, as shown. Thus, each of the components parts is a more or less block-like element which can be readily formed of wood, plastic or other material. The component parts, for example, would be readily formed by suitable molding of plastic in accordance with any desired and well known procedure. Similarly, wood elements may be readily formed by severing of a basic block of wood to the desired shape and with the desired separating lines.

The device of the present invention might also be formed of course of a flat sheet-like material, either flexible or rigid. In such instance, the elements might readily be formed by a simple stamping process. All such procedures are readily available in the commercial art and presently used in construction of other devices. Thus, the present invention does not require the same of any special machinery and can readily be adapted to presently existing manufacturing machines.

Each of the character elements is preferably color coded such that the several individual parts for any given element can be readily separated by the child.

Further, as shown in FIG. 3, each component part may be individually identified by indicia as at 34b including the character formed by combination and with the total number of parts for forming that particular character. The indicia is shown in FIG. 3 stamped on each edge of part. The indicia is shown oppositely stamped twice across each letter part for convenience of assembly without however directly indicating the top and bottom surfaces of the parts. If directional information is desired, a single set of indicia may be provided.

Further, as previously noted, each element can be formed with the individual parts releasably secured to each other with any suitable releasable attachment means for progressive development of the difficulty in use. For example, a water soluble adhesive layer 35 may be applied to the mating edge surface of the parts, as shown in FIG. 3. The component parts could readily be separated by merely applying water to one or more of the surfaces. To provide a progressive challenge to a child, the instructor merely progressively separates the elements on more or less available separating lines such that the child or learner starts with a lesser number of parts with which to contend and operate, and progressively increases to a greater number.

In a preferred embodiment of the present invention the parts are all generally similar with respect to the size and physical orientation. All have elements particularly with common and similar surfaces as the result of the use of the substantially straight line concept. This avoids great confusion to the student such as in the use of arbitrary division lines, particularly where a substantial division is created. Each character is of course of a more or less uniform breadth and uniform thickness, with appropriate coloring and other indicia to appropriately relate the parts.

The device of the present invention may be used by the student or child for both educational and pleasure. The challenge can be directly related not only to the learning ability of the child but to be helpful in developing the child's physical dexterity as the result of the working with his or her hands.

Various modes in carrying out the invention are contemplated as being within the scope of the following claims, particularly pointing out and distinctly claiming the subject matter which is regarded as the invention.

I claim:

1. An educational and amusement device, comprising a plurality of individual elements each of which defines a character from an alphabet system or a numerical system, each of said elements being divided into a plurality of separate parts defined by a first separating set of a plurality of substantially parallel dividing lines angularly oriented with respect to a centered cartesian coordinate system of said element, a plurality of said elements including a second separating set of lines, said second separating set of lines being angularly oriented lines extending substantially perpendicular to said first plurality of angularly oriented lines, wherein each of said plurality of individual elements includes only said first and second separating sets to define said parts.

2. The device of claim 1 having each of said elements being uniquely color coded.

3. The educational and amusement device of claim 1 wherein a substantial number of said parts being provided for each element and being interconnected to each other by a releasable attachment means whereby the degree of separation within each element can be progressively changed, to permit progressively increasing the number of parts for any given element.

4. The device of claim 3 wherein each of said elements consists of at least four parts and no more than six parts.

* * * * *